(12) United States Patent
Pantzar

(10) Patent No.: US 7,637,701 B2
(45) Date of Patent: Dec. 29, 2009

(54) TOOL AND A CUTTING INSERT FOR CHIP REMOVING MACHINING

(75) Inventor: Göran Pantzar, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 519 days.

(21) Appl. No.: 11/633,069

(22) Filed: Dec. 4, 2006

(65) Prior Publication Data
US 2007/0160431 A1    Jul. 12, 2007

(30) Foreign Application Priority Data
Dec. 8, 2005   (SE) .................................. 0502712

(51) Int. Cl.
B23C 5/00   (2006.01)
B23C 5/16   (2006.01)

(52) U.S. Cl. ...................................... 407/113; 407/115

(58) Field of Classification Search ......... 407/113–116, 407/103, 109, 66, 67, 33
See application file for complete search history.

(56) References Cited

U.S. PATENT DOCUMENTS

| | | | | |
|---|---|---|---|---|
| 5,924,826 | A | * | 7/1999 | Bystrom et al. ............. 407/103 |
| 6,152,658 | A | * | 11/2000 | Satran et al. ................. 407/103 |
| 7,001,114 | B2 | * | 2/2006 | Blucher et al. .............. 407/103 |
| 7,510,354 | B2 | * | 3/2009 | Andersson et al. .......... 407/113 |
| 7,537,419 | B2 | * | 5/2009 | Sjoberg et al. .............. 407/103 |

FOREIGN PATENT DOCUMENTS

| | | |
|---|---|---|
| WO | 02/055243 | 7/2002 |
| WO | 03/004204 A1 | 1/2003 |
| WO | 2005/072898 | 8/2005 |

* cited by examiner

*Primary Examiner*—Willmon Fridie
(74) *Attorney, Agent, or Firm*—Drinker Biddle & Reath LLP

(57) ABSTRACT

A tool and a cutting insert for chip removing machining, such as milling, turning or the like. The cutting insert includes a chip-removing main edge, which is separated from a center of the cutting insert and from which a clearance surface extends toward a transition to an underside in the form of a connecting surface, in which an elongate engagement means, e.g., a ridge, is included, which is situated nearer the transition than the center of the cutting insert, and includes a flank having the purpose of transferring cutting forces in the direction transverse to the length extension of the ridge. The ridge is the only active engagement means of an imaginary triangle between the center of the cutting insert and opposite ends of the transition, besides which the flank has a cross section-wise convex shape. In such a way, the active edge of the cutting insert is located in a desired exact position in relation to the tool, even if the cutting insert is impaired by minor form defects.

40 Claims, 13 Drawing Sheets

TOOL AND A CUTTING INSERT FOR CHIP REMOVING MACHINING

This application claims priority under 35 U.S.C. § 119 to Sweden Patent Application No. 0502712-3, filed on Dec. 8, 2005, the disclosure of which is incorporated by reference herein in its entirety.

FIELD OF THE INVENTION

The present invention relates generally to a tool for chip removing machining of the type that includes a basic body having an insert seat that is defined by a center and is in the form of a connecting surface, in which there is included an elongate and female- or male-like, primary engagement means spaced apart from the center, and a replaceable cutting insert having at least one chip-removing main edge, which is spaced apart from a center of the cutting insert, and from which a clearance surface extends toward a transition to an underside in the form of a connecting surface, in which an elongate and male or female-like, secondary engagement means is included, which is positioned nearer the transition than the center of the cutting insert, and includes a flank that is pressable against a support surface included in the primary engagement means of the connecting surface of the basic body. In another aspect, the invention relates to the cutting insert as such.

BACKGROUND OF THE INVENTION

Within the field of chip removing or cutting machining of, above all, blanks of metal, a continuous development is going on with the purpose of making more effective not only the capacity of the tools to carry out the machining in a fast and accurate way, but also the manufacture of the different parts of the tools in the form of basic bodies (holders) and replaceable cutting inserts. A trend is to improve the machining results in respect of the precision and surface finish, which requires that the active edge of the cutting insert obtains an exact, predetermined position in relation to the basic body. In many applications, the requirements of position precision are extreme. Another trend is to reduce the costs for the manufacture of the tools. This has, among other things, implied that the cutting inserts made of cemented carbide, which are the most commonly occurring on the market, have got a better and better dimensional accuracy already in connection with the compression moulding and sintering. In order to obtain good precision of the cutting inserts, it was previously necessary to subject the same to expensive grinding operations, but by means of the improved compression-moulding and sintering technique it has become possible to use directly pressed, i.e., unground cutting inserts in more and more applications. However, such development has merely advanced such that the tool constructor still has to allow for a dimensional variation on the order of (+/−) 0.5% of the nominal dimension of the cutting insert. This means that the active edge of the cutting insert very well may end up in the desired position, in which case the outcome of the insert production is good, but when the outcome is worse (so far that the cutting insert has swollen and become longer, or shrinked and become shorter than intended), the position of the cutting edge in relation to the basic body may deviate to such a high extent from the desired position that the machining precision will be unsatisfactory.

In older tools, the exact position of the active cutting edge was determined by the distance between the edge and a clearance surface positioned on the opposite side of the cutting insert, which clearance surface was pressed against a cooperating, rear or inner support surface in the insert seat of the basic body. In this case—when the rear clearance surface of the cutting insert formed a reference point that determined the space position of the front edge—the position precision of the edge could become catastrophically poor, provided that the cutting insert was not ground, because the distance between the active edge and the opposite clearance surface is—in this connection—considerable, in particular when the tools and the cutting inserts are big. Recently, so-called serration connecting surfaces have been developed as means for holding the cutting inserts. In such a way, the position precision of the cutting edge has been possible to be redoubled (i.e. the tolerance is halved), more precisely by the fact that a central ridge on the serration connecting surface of the cutting insert is chosen as a reference point for the position of the cutting edge. By the fact that the central ridge is halfway between opposite sides/edges of the cutting insert, the distance is halved between the active cutting edge and the locating reference point, with the ensuing halving of the tolerance errors. However, also this position precision has been unsatisfactory in many of the applications that require better and better machining results.

With the purpose of managing the above-mentioned shortcomings of the tools that make use of serration connecting surfaces in the interface between the cutting insert and the insert seat of the basic body, International Patent Application Publication No. WO 2005/072898 discloses making the parallel ridges and grooves, which together form the insert seat or serration connecting surface of the basic body, in such a way that the width of the grooves progressively increases in the direction from a front groove toward a rear one, the front groove forming the reference locus from which possible form defects can be distributed backwardly or inwardly toward the other grooves. This means that the distance between the active edge of the cutting insert and the fixed reference locus in the form of the front groove is reduced to a fraction of the length of the cutting insert. In other words, the impact of the form defects on the position of the edge is reduced to a corresponding extent. However, even if this solution has given promising results, the same has turned out to have certain drawbacks. One of these is that the great number of ridges on the connecting surface of the cutting insert complicates the manufacture of the cutting inserts. More precisely, form defects may manifest themselves in small irregularities in the planar flank surfaces of the ridges, the irregularities occurring randomly on different ridges and on different parts of the same. When the outcome of the manufacture is bad, such irregularities on the numerous ridges may cause the ridges not to engage correctly with the grooves in the connecting surface of the basic body, in spite of the grooves being formed with progressively increasing widths. Furthermore, the front ridge of the cutting insert, positioned closest to the edge, may jam in the appurtenant groove in the connecting surface of the basic body, whereby the cutting insert is locked so that it cannot tilt down freely into the desired position. To this, it should be added that the interface in question, which makes use of true serration connecting surfaces, only can transfer force in a single coordinate direction, i.e. perpendicularly to the length extension of the ridges.

International Patent Application Publication No. WO 02/055243 discloses a known tool, the cutting insert and basic body of which are connected with each other via serration connecting surfaces, the ridges of which are formed with thin, string-like material portions, which project in relation to the otherwise planar flank surfaces of the ridges. However, the purpose of these material strings is to predetermine the locus of the contact between co-operating flank surfaces, but not to allow free adjustment of the contact places upward or downward along the surfaces.

The present invention aims at obviating the above-mentioned drawbacks of previously known cutting tools of the type initially mentioned, and at providing an improved cutting tool. Therefore, an object of the invention, in a first aspect, is to provide a cutting tool that allows the use of unground cemented-carbide inserts, the precision of which, in respect of the position of the active cutting edge in relation to the basic body, is optimum.

Another object of the invention is to provide a tool, the interface of which between the cutting insert and the basic body can transfer forces in two different coordinate directions, e.g., radially as well as axially.

Yet another object of the invention is to simplify and cheapen the manufacture of, primarily, the cutting inserts.

Still another object is to provide a tool that allows the use of indexable cutting inserts having a plurality of edges, without the edges—in spite of the plurality thereof—running the risk of being incorrectly positioned.

It is also an object to provide a tool, the interface of which between the cutting insert and basic body allows the use of cutting inserts having most dissimilar basic shapes.

Thus, the cutting inserts should be possible to have a polygonal basic shape, such as triangular, square, parallelepipedic, rhombic, pentagonal, hexagonal, septagonal, octagonal, etc., or be round, preferably circular. Furthermore, the cutting insert should be fixable in the insert seat by means of arbitrary means, such as screws, clamps, lever mechanisms, eccentric mechanisms, etc.

SUMMARY OF THE INVENTION

The invention is based on the intention to form the interface between the basic body of the tool and the cutting insert with a minimum of engagement means in the form of ridges and notches, and to make the engagement means of the cutting insert, which is positioned closest to the active edge of the cutting insert, in such a way that the same—in connection with the mounting of the cutting insert—can freely assume different tilt positions in relation to the corresponding engagement means of the basic body, all depending on possible form defects of the cutting insert. This effect is attained by the flank included in the engagement means of the cutting insert, and which has the purpose of transferring substantial forces to a co-operating support surface of the basic body, has a convex, i.e., bulging, cross-section shape, which most suitably is defined by an involute curve. In such a way, a contact line between the flank surface and the support surface (which may be planar) can assume different level positions upward as well as downward along the surfaces from a neutral position, which is assumed if the cutting insert has no form defects.

In an embodiment, the invention provides a tool for chip removing machining, including a basic body having an insert seat defined by a center and in the form of a connecting surface, in which there is included an elongate and female or male primary engagement means spaced apart from the center, and a replaceable cutting insert having at least one chip-removing main edge, which is spaced apart from a center of the cutting insert, and from which a clearance surface extends toward a transition to an underside in the form of a connecting surface, in which an elongate and male or female secondary engagement means is included, which is positioned nearer the transition than the center of the cutting insert, and includes a flank that is pressable against a support surface included in the primary engagement means of the connecting surface of the basic body. The secondary engagement means is the only active engagement means of the cutting insert in an imaginary triangle between the center of the cutting insert and opposite ends of the transition. The flank has a cross section-wise convex shape.

In another embodiment, the invention provides a cutting insert for chip removing machining, including a chip-removing main edge, which is separated from a center of the cutting insert and from which a clearance surface extends toward a transition to an underside in the form of a connecting surface, in which an elongate, male or female engagement means is included, which is positioned nearer the transition than the center of the cutting insert, and includes a flank for transferring cutting forces in a direction transverse to the length extension of the engagement means. The engagement means is the only active engagement means in an imaginary triangle between the center of the cutting insert and opposite ends of the transition. The flank has a cross section-wise convex shape.

In yet another embodiment, the invention provides a cutting insert for chip removing machining, including a chip-removing main edge separated from a center of the cutting insert, a clearance surface extending from the main edge toward a transition, an underside extending from the transition, the underside being a connecting surface, and one of an elongate male and elongate female engagement member formed on the underside, positioned nearer the transition than the center of the cutting insert, and including a flank that transfers cutting forces in a direction transverse to a length extension of the engagement member. The engagement member is the only active engagement in an imaginary triangle between the center of the cutting insert and opposite ends of the transition. The flank has a cross section-wise convex shape.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
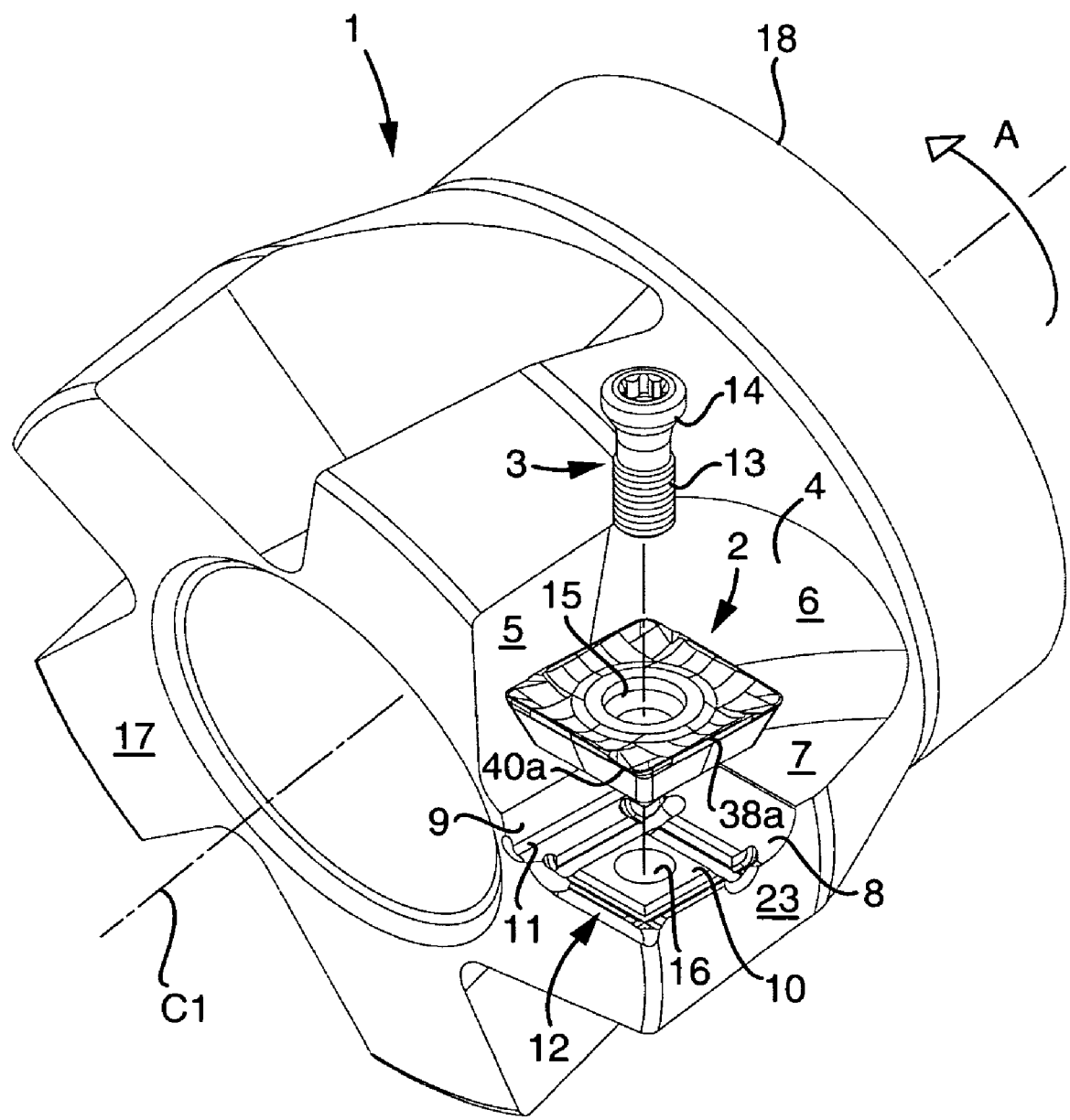
FIG. 1 is a simplified, perspective exploded view showing a cutting tool in the form of a milling cutter, as well as a released cutting insert and a tightening screw for the fixation of the cutting insert.
Figure 3:
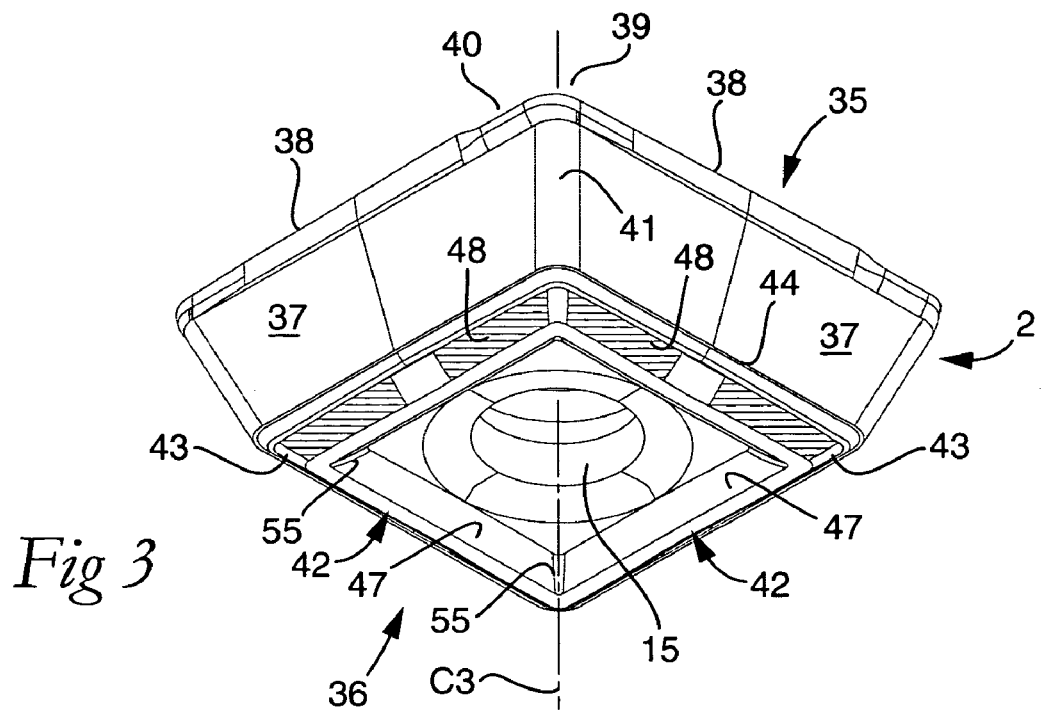
FIG. 3 is a perspective view showing the cutting insert obliquely from below.

Before the invention is described closer, reference being made to the appended drawings, the implication of certain concepts, used to define the features that characterize the invention, are briefly elucidated below.

"Connecting surfaces" are two mating surfaces that form an interface between the basic body and cutting insert of the tool, one of which is included in an underside of the cutting insert, and the other one of which is formed in the basic body.

"Chip surface" is the surface that forms the topside of the cutting insert, and which in flat cutting inserts is generally parallel to the underside. The chip surface as such does not need to be planar, but has most often an irregular topography. In connection with the invention, the chip surface is incidental.

"Clearance surface" is the surface that extends between the topside and the underside of the cutting insert. When the cutting insert has a positive geometry, the clearance surface forms an acute angle with the topside and obtuse angle with the underside. In negative cutting inserts, the clearance surface forms an angle of at least 90° with the topside. The invention is applicable to cutting inserts irrespective of the same being positive or negative. The clearance surface may—but does not need to—be planar.

"Edge" as used without prefix, is primarily the main edge or main edge line, which has the purpose of removing chips from the blank being machined. Cutting inserts having a polygonal, i.e., multi-angular shape, usually also include a secondary edge (wiper edge) situated near each corner and that is co-operating with the respective main edge. While the main edge provides for the chip removal, the purpose of the secondary edge is to strike off or smooth the surface of the blank generated.

"Transition" relates, in this connection, to the locus where the clearance surface transforms into the underside of the cutting insert. This transition may be either imaginary or real, e.g., by being embodied in the form of a turning line between two surfaces. However, in both cases, the transition is imagined to be represented by a geometrical (straight or arched) line having two opposite ends.

"Engagement means" is an overall concept for either a male-like element, which is insertable into a female-like space, or a female-like space into which a male-like element can be inserted. In most subsequent embodiments, the male-like engagement means are in the form of ridges and the female-like engagement means are in the form of notches or countersinks.

"Flank" relates to the surface that is included in an engagement means and that should transfer force to a support surface included in another, co-operating engagement means. When the flank is included in a ridge, the same forms one of the two opposite long sides of the ridge. A flank does not necessarily have to be composed of a single smooth and continuous surface, in that the flank also may be composed of a plurality of smaller part surfaces.

"Insert seat" is the locus of the basic body where the cutting insert is mounted. In relation to the invention, the concepts "insert seat" and "connecting surface" are synonymous so far that the connecting surface, in which the connecting surface of the cutting insert mates, forms the insert seat of the basic body.

In FIG. 1, a cutting tool is shown that includes a basic body 1 and a cutting insert 2, which is fixable to the basic body by means of a tightening member 3, which in this case is in the form of a screw. In the example, the tool is rotatable and is a milling cutter, more precisely an end or face mill, which includes a plurality of chip pockets 4 in which equally many cutting inserts (only one of which is shown in FIG. 1) can be mounted. The basic body 1 is rotatable around an axis designated C1. The individual chip pocket 4 is delimited by a planar side surface 5, a concavely arched end surface 6 and a planar step surface 7, the last-mentioned one of which, via a concavely arched surface 8 (see also FIG. 2), transforms into a countersink, which is delimited by, in addition to the surface 8, a side surface 9 and a planar bottom surface 10, which transforms into the side surface 9 via a radius transition 11. In the bottom surface 10, a number of notches are formed, which together form a connecting surface or an insert seat generally designated 12. This is described in more detail below.

With continued reference to FIG. 1, the tightening screw 3 includes a male thread 13 and a head 14, which in this case is conical (but which also may have another shape, e.g., flat). The screw 3 may be inserted through a central, through hole 15 of the cutting insert 2, and is tightened in a female thread (not visible) of a hole 16, which mouths in the bottom surface 10.

In FIG. 1, 17 designates a front end surface and 18 a limiting line of a rear end surface, while 23 designates a rotationally symmetrical envelope surface. In operation, the milling cutter rotates in the direction of the arrow A.

The cutting insert 2 is flat and the insert seat 12 is formed in the basic body in such a way that the cutting insert—in the example—obtains a positive axial setting angle, as well as a negative radial setting angle (these angles are of no importance to the invention and are therefore not shown in the drawings).

Now reference is made also to FIGS. 2-18, which in detail illustrate features of the invention. The invention primarily relates to the interface between the cutting insert and the basic body, i.e. the connecting surface 12 that forms the insert seat of the basic body, and a corresponding connecting surface on the underside of the cutting insert.

Figure 2:
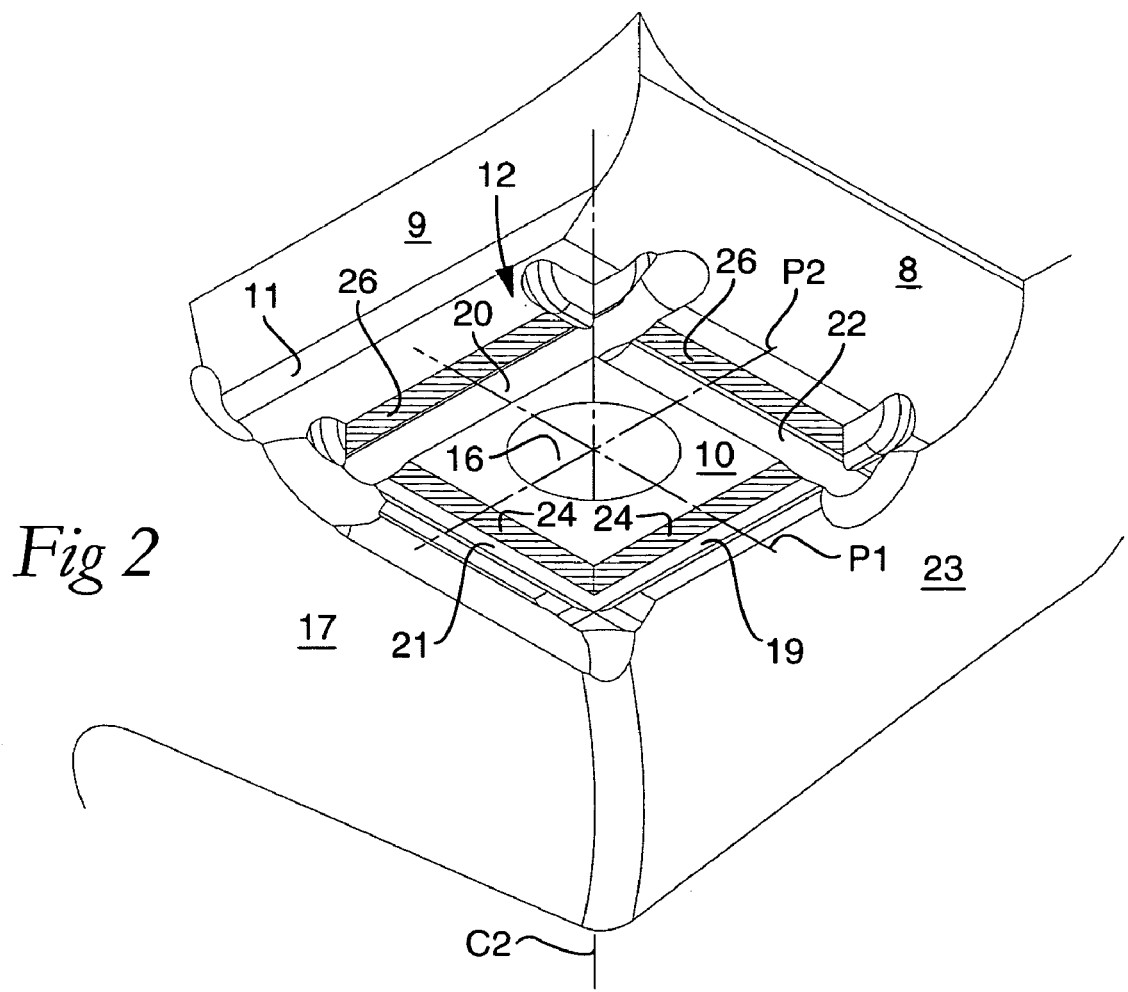
FIG. 2 is a partial perspective view, which illustrates the insert seat in the basic body on an enlarged scale.

FIG. 2 illustrates that the connecting surface 12 is formed of four notches 19, 20, 21, 22, the notch 19 of which is positioned near the envelope surface 23 of the milling cutter, while the notch 21 is positioned near the end surface 17. The notches are elongate and meet each other at right angles. In practice, the same may be provided by chip removing machining of the material of the basic body 1, preferably milling. In this connection, it should be pointed out that the basic body most suitably is manufactured from a metal, such as steel, aluminium or the like, having a certain inherent elasticity, at least in comparison with the material of the cutting insert 2, which in practice is made from a hard, wear-resistant material without any appreciable elasticity, such as cemented carbide, cement, etc.

The threaded hole 16, which mouths in the bottom surface 10, is defined by a center axis C2. Two planes P1, P2 perpendicular to each other, which are represented by simple, dash-dotted lines, intersect each other along the center axis C2. The plane P2 extends generally in the axial extension of the tool (without necessarily being parallel to the center or rotation axis C1 of the milling cutter), while the plane P1 extends generally radially (without necessarily being oriented perpendicularly to the axis C1). The orientation of the planes P1, P2 in relation to the rotation axis C1 depends on the radial and axial setting angles that have been selected for the milling cutter in question. In other words, the lines C2, P1 and P2 form a separate system of coordinates, which is not directly related to the rotation axis C1 of the milling cutter.

Two of the notches, i.e. notches 19 and 21, are similar, so far that they individually are delimited by two spaced-apart, opposite support surfaces 24, 25 (see also FIG. 12), the support surface 24 of which is situated closest to the center axis C2 of the connecting surface and therefore is denominated "inner" support surface. The second support surface 25 is an outer support surface, which is situated nearer surface 23 (or 17). The two other notches 20, 22 are homologous so far that they only include a single support surface 26, and that the same are wider than the notches 19, 21. The notches in question form primary engagement means, which are female-like in order to co-operate with male-like, secondary engagement means in the form of ridges on the cutting insert.

Figure 12:
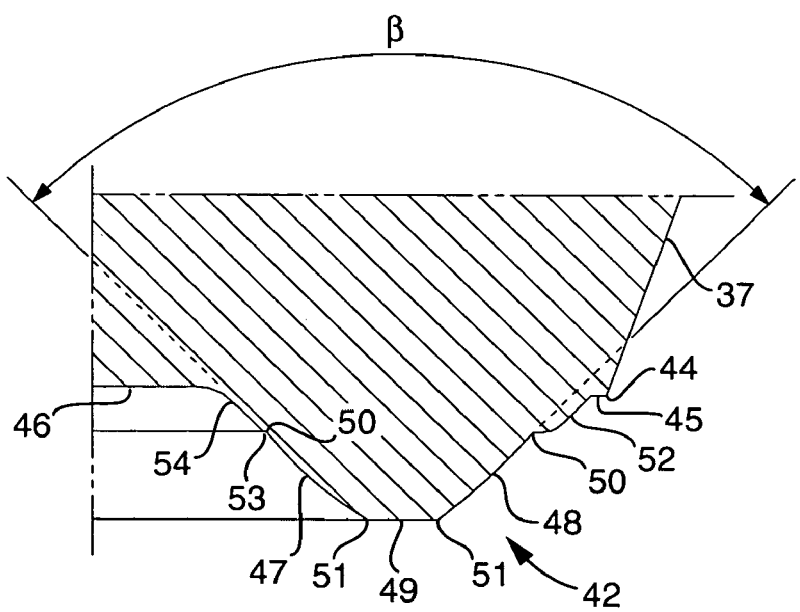
FIG. 12 is an analogous section of FIG. 11 showing the ridge removed from the notch.
Figure 12:
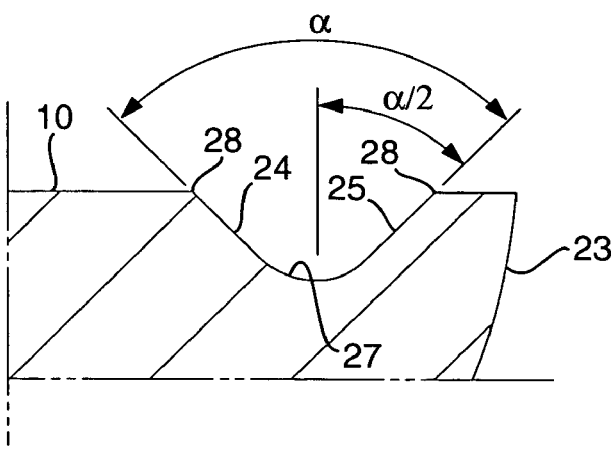

As illustrated in FIG. 12, the two support surfaces 24, 25 of the individual notch 19, 21 diverge from a flute-like bottom 27 toward an upper opening in flush with the planar bottom surface 10. The angle of divergence a should amount to at least 90° and may advantageously be obtuse. Each individual support surface 24, 25 may—but does not need to—be planar, the individual notch most suitably being generally straight so far that the upper limiting edges 28 of the notch are mutually parallel.

Figure 13:
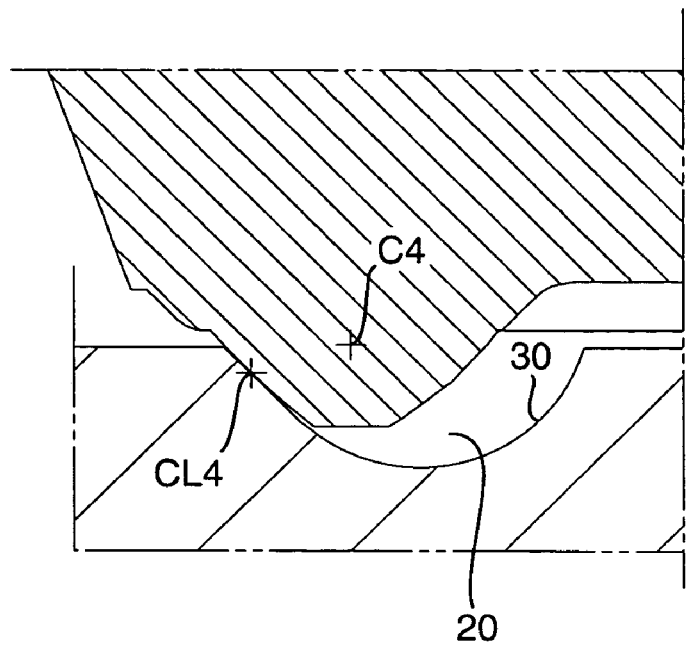
FIG. 13 is a section showing a ridge at the opposite end of the cutting insert, the ridge being inserted in a notch having another design than the notch according to FIGS. 11 and 12.
Figure 14:
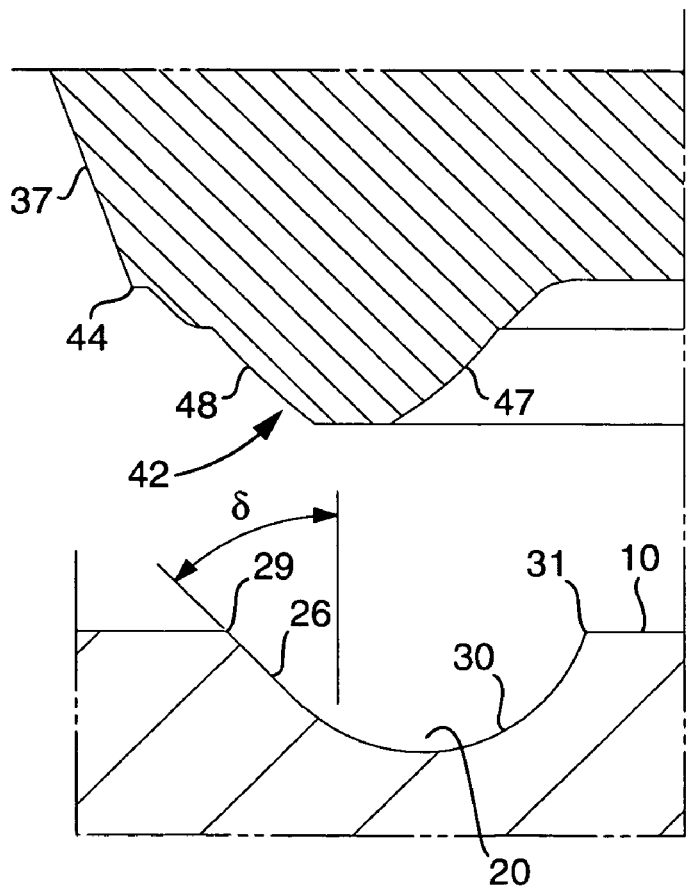
FIG. 14 is an analogous section of FIG. 13 showing the ridge removed from the notch.

As illustrated in FIGS. 13 and 14, the single support surface 26 of the notches 20, 22 extends between a limiting line or turning line 29 toward the surface 10, and a concavely arched surface 30 that transforms into the surface 10 via a limiting line 31. The distance between the limiting lines 29, 31 is greater than the distance between the limiting lines 28 of the notches 19, 21, i.e., the notches 20, 22 are wider than the notches 19, 21. In the example, the notches 20, 22 are about 40% wider than the notches 19, 21. The notches 20, 22 are also straight so far that the limiting lines 29, 31 are mutually parallel. The angle δ of the support surface 26 to the vertical may—but does not need to—coincide with the corresponding angle α/2 of the support surface 25 (see FIG. 12).

The two notches 19, 21, which include two support surfaces 24, 25, will henceforth be denominated main notches, while the notches 20, 22, which include only one support surface 26, henceforth are denominated blind notches.

In FIGS. 7-10, it is seen that each one of the two outer or peripheral notches 19, 21 are delimited by long narrow borders or border-like material portions 32, 33, which have differing design so far that the border 32 generally is thicker than the border 33. Thus, the border 32 is delimited between the outer support surface 25 of the notch 19 and the envelope surface 23, while the border 33 is delimited between the support surface 25 and a concavely arched surface 34, which has been provided by a recess in the surface 17. This entails that the border 33 becomes comparatively thin. By the material of the basic body, e.g., steel, having a certain inherent elasticity, the border 33 may therefore, if required, yield (at least partially) to forces that aim to bend out the same. In this context, it should be noted that the border 33 has a thickness that is smaller than the height thereof in order to provide such resiliency.

Reference is now made to FIGS. 3-6, which illustrate features of the cutting insert 2. In this case, the cutting insert has a flat and polygonal, more precisely square basic shape, and has a topside 35, an underside 36 and four clearance surfaces 37, which generally extend between the topside and the underside. The underside 36 forms, by the particular design thereof, a connecting surface for the co-operation with the connecting surface 12 of the basic body 1. In other words, the concepts "underside" and "connecting surface" are synonymous. The cutting insert has an axis C3, which in this case is a center axis of the hole 15 and forms the center of the cutting insert. The top-and undersides 35, 36 generally extend perpendicularly to the axis C3, i.e., the topside and the underside are mutually parallel.

Figure 4:
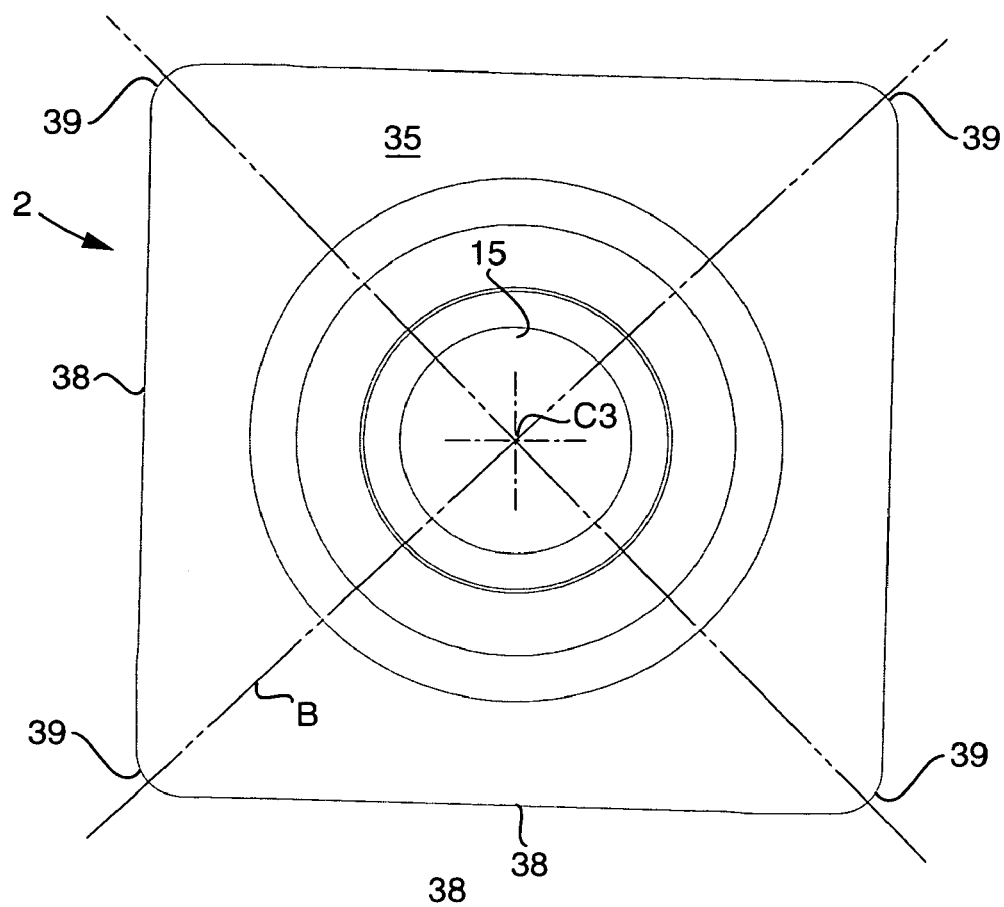
FIG. 4 is a plan view showing the cutting insert from above.

Since the topography of the chip surface is of no importance to the invention, the same is shown in FIG. 4 only as a neutral, planar surface without any chip breaker. Between the topside 35 and the individual clearance surface 37, a chip-removing main edge 38 is formed. Furthermore, the cutting insert has four corners 39, which individually are defined by a bisector B between two main edges 38 meeting each other. The individual main edge 38 transforms into a secondary edge 40, which has the purpose of wiping or smoothing the surface generated in the workpiece. It should also be mentioned that the clearance surfaces 37 at the corners 39 transform into each other via convexly arched corner surfaces 41.

In the embodiment shown, the connecting surface 36 includes equally many male-like ridges 42 as the number of main edges 38, i.e., four, the ridges being integrated into a continuous, quadrangular frame having four corner portions 43.

Each individual ridge 42 forms a male-like, secondary engagement means for the co-operation with the primary, female-like engagement means in the form of the notches 19 and 21 in the basic body. Now reference is made also to FIGS. 11-14, which in detail illustrate the nature of the individual ridge 42. Since all four ridges have one and the same design, only one ridge will be touched upon.

In FIG. 12, it is seen that the clearance surface 37 extends down to a transition designated 44 toward the underside of the cutting insert. In this case, the transition 44 is in the form of a turning line between the clearance surface 37 and a thin, planar surface 45, which in the example is situated on approximately the same level as a planar surface 46 inside the ridge 42.

The ridge 42 is delimited by two opposite, inner and outer flanks or flank surfaces 47, 48, which converge toward a crest 49, which in this case is a planar, long narrow surface. Each individual flank 47, 48 extends between upper and lower border lines 50, 51, the lower one of which in this case is a turning line to the crest surface 49. The upper border line 50 of the outer flank 48 is a turning line to a surface, designated 52, of a step, which is formed between the surfaces 45 and 48. The upper border line 50 of the inner flank 47 is a turning line to an utmost narrow surface 53 of a step 54, which in turn transforms into the planar surface 46.

A characteristic feature of the invention is that at least the inner flank 47 has a cross section-wise convex or bulging shape, contrary to the planar shape that characterizes, for instance, the flanks included in the serration connecting surfaces according to the above-mentioned International Patent Application Publication No. WO 2005/072898. In the shown, preferred embodiment, the two flanks 47, 48 are cross section-wise conformal and symmetrical in relation to an axis designated C4, which extends inside the ridge and defines the same. As viewed crosswise, in this case each infinitesimal surface portion of the individual flank extends continuously or unbroken between the upper and lower border lines 50, 51. In this respect, the two flanks 47, 48 are identical. However, as viewed longitudinally of the ridge, the flanks differ from each other in the following respect (see FIGS. 3 and 5). The inner flank 47 of each ridge extends continuously between border lines 55, which form the ends of the proper flank surface. The end-limiting lines are situated at a certain, short distance from the corner portion in which the individual ridge transforms into an adjacent ridge. In other words, the inner flank or the flank surface is somewhat shorter than the proper ridge in its entirety. The length of the outer flank 48 is also determined by border lines 56, more precisely in the form of turning lines to the rounded corner transitions 43. However, in an area half-way between the end-limiting lines 56, a countersink 57 is formed in the outer flank 48, the length of which countersink is determined by two border lines 58. The depth of the countersink 57 is very moderate and may in practice amount to one or a few thousandths of a millimeter. Nevertheless, the countersink 57 separates two part surfaces, which together form the outer flank 48. In this connection, it may be noted that the total length of the outer flank 48 between the border lines 56 is greater than the length of the inner flank 47 between the border lines 55.

Figure 15:
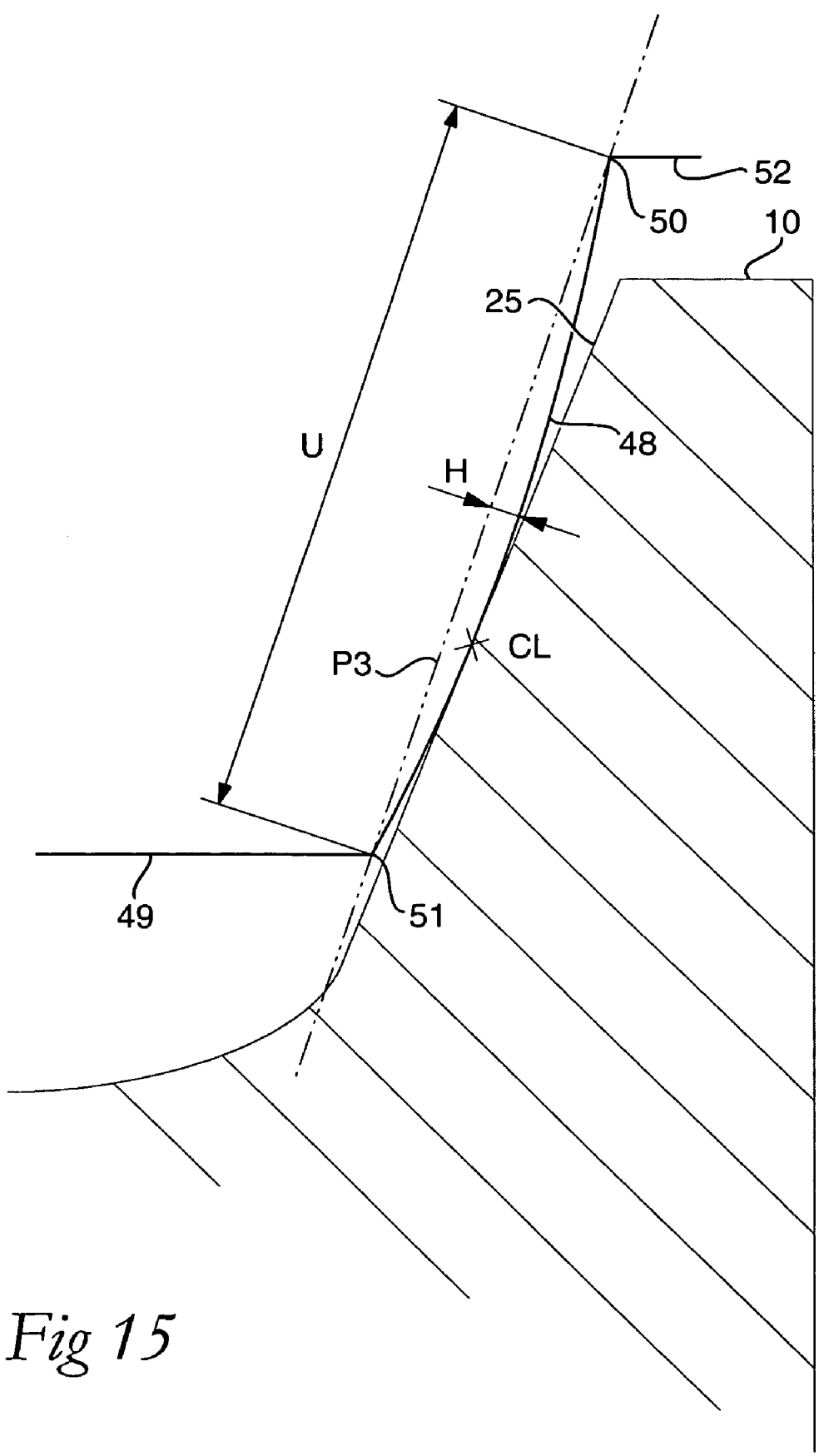
FIG. 15 is an extremely enlarged detailed section showing one of the two flanks of a ridge in contact with a support surface that delimits a notch

In FIG. 15, an individual flank is shown, i.e. the outer flank 48, in contact with a support surface in the form of the support surface 25. As a consequence of the convexly arched shape of the flank 48 in combination with the planar shape of the support surface 25, the contact between the surfaces in question will, at least initially, manifest itself in a line contact, which is outlined by means of the contact line CL. The contact is linear at least as long as the surface 25 has not been coined (i.e., plastically deformed) by repeated insert exchanges. Due to the arched shape of the flank 48, the contact line CL can assume different level positions upward as well as downward along the surfaces 48, 25, depending on if the cutting insert is parallel to the planar surface 10 of the insert seat or assumes a tilted, oblique position in relation to the same.

The arching or bulging of the individual flank may be more or less marked. The chord height, which in FIG. 15 is designated H, is defined as the perpendicular distance between an imaginary plane P3 between the upper and lower border lines 50, 51 of the flank, and the point of the flank situated farthest out in relation to this plane. The extension of the flank between the border lines 50, 51 is designated U. In practice, the chord height H should amount to at most 1/10 of the extension U of the flank. Advantageously, the chord height may be smaller, although it should amount to at least 1/100 of U.

In a preferred embodiment, the convex cross-section shape of the individual flank is defined by an involute curve, i.e., the shape of the flank is the same as the shape of the flanks of conventional teeth.

The angle of convergence β of the individual ridge 42 (see FIG. 12) is defined as the angle between the imaginary plane P3 of the flanks.

Figure 5:
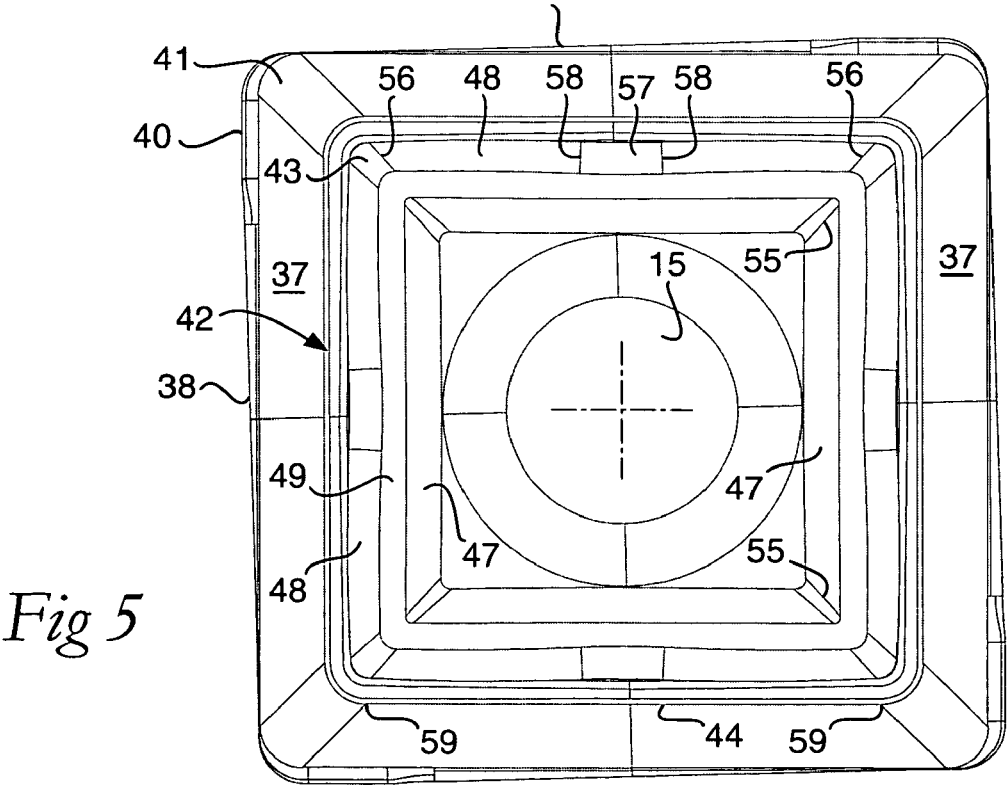
FIGS. 5-6 are plan views showing the cutting insert from below.
Figure 6:
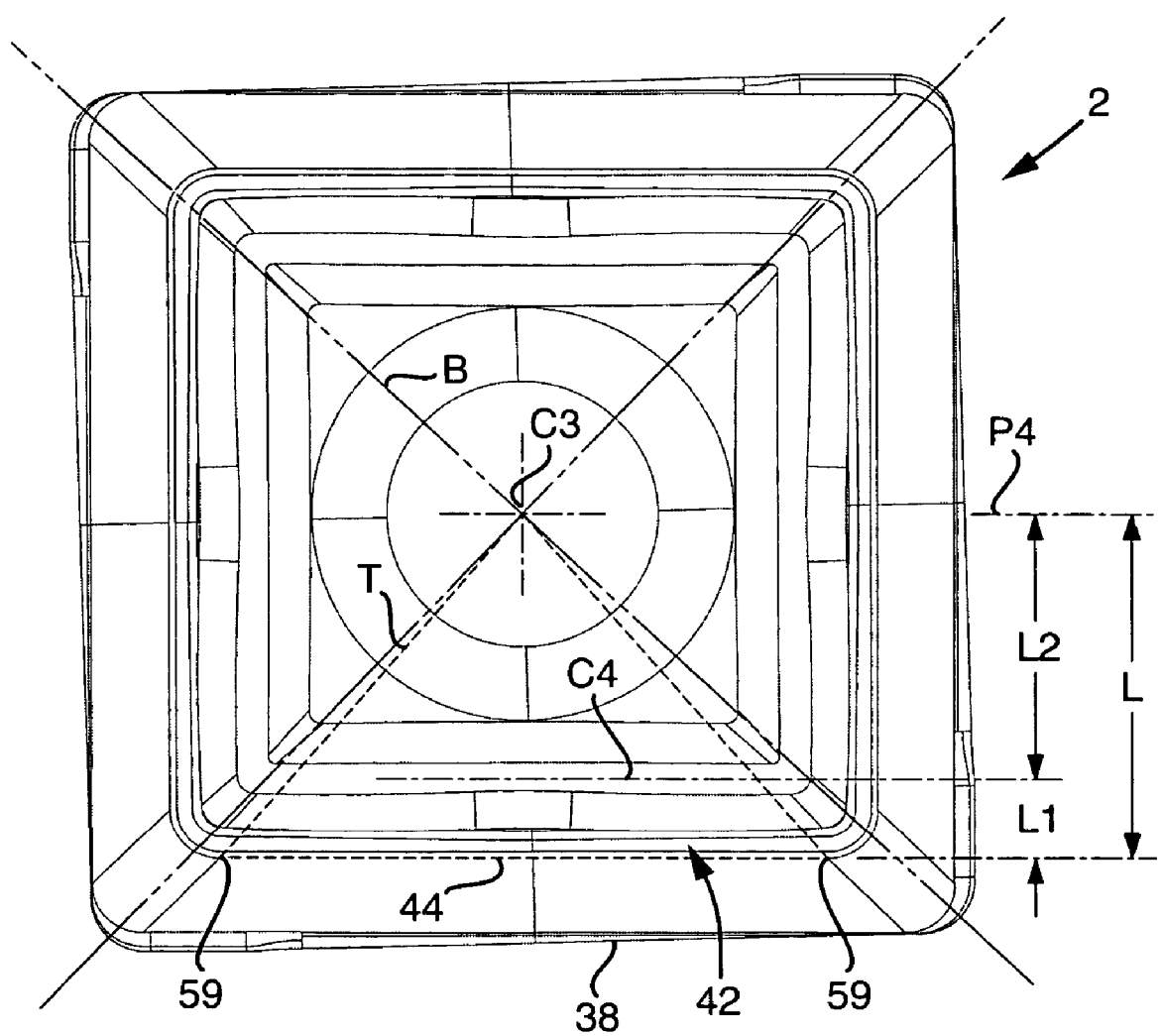
Figure 7:
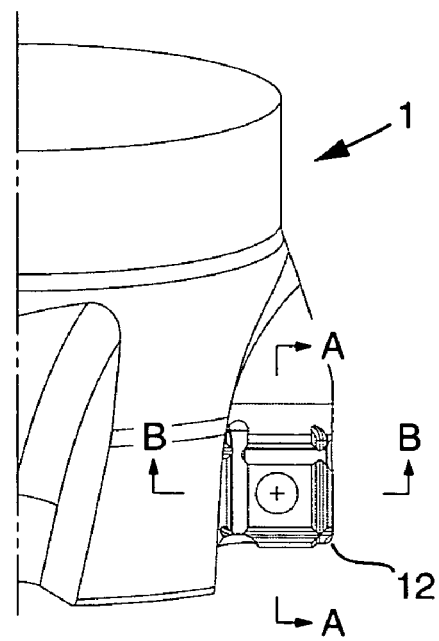
FIG. 7 is a partial side view of the milling cutter and an insert seat included in the same.
Figure 8:
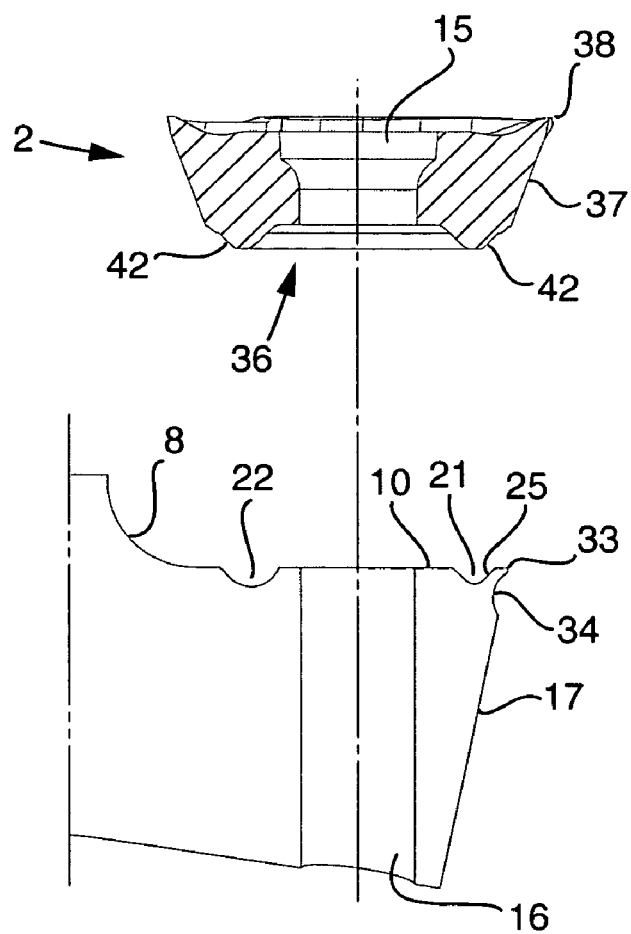
FIG. 8 is an exploded view showing the insert seat in section A-A in FIG. 7, as well as a cutting insert in the same section.
Figure 9:
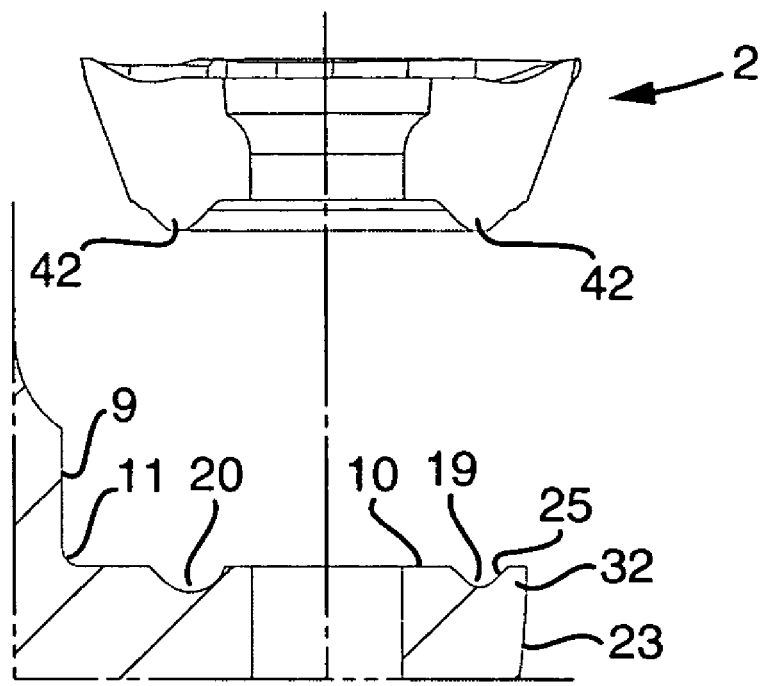
FIG. 9 is an exploded view corresponding to FIG. 8 showing the insert seat and a cutting insert in section B-B in FIG. 7.
Figure 10:
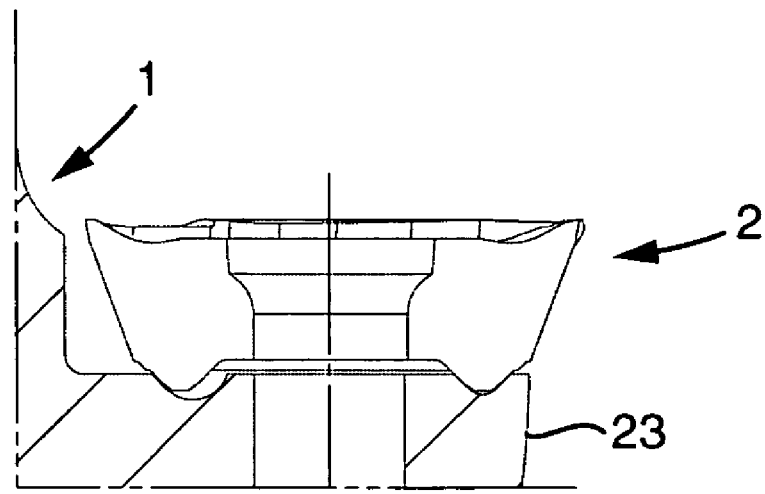
FIG. 10 is a section showing the cutting insert mounted in the insert seat.
Figure 11:
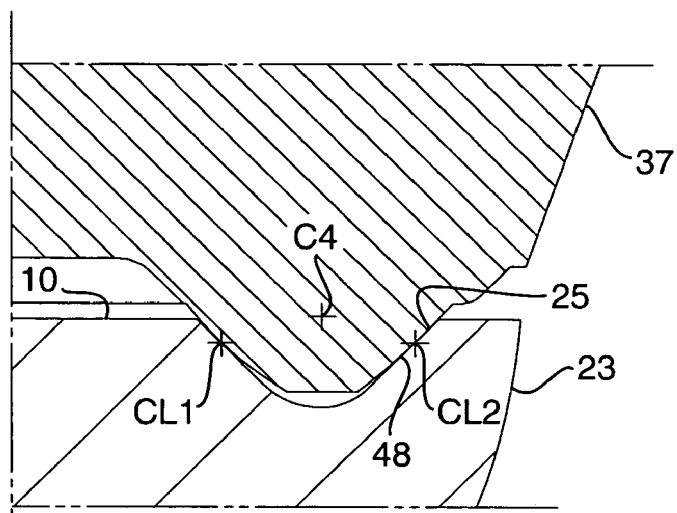
FIG. 11 is a very enlarged detailed section showing a ridge included in the cutting insert in engagement with a corresponding notch in the insert seat.

Reference is now made to FIGS. 5 and 6, in which the two opposite ends of the turning line 44 are designated 59. Such as has been previously mentioned, the turning line 44 forms the transition at which the clearance surface 37 transforms into the underside of the cutting insert. The turning line 44 forms one of three dashed lines in an imaginary triangle T, the two other lines of which extend between the end points 59 and the center C3 of the cutting insert. In FIG. 6, also the center line C4 of the ridge is shown in the form of a dash-dotted line. The center line C4 is situated at a distance designated LI from the transition 44, and simultaneously positioned at a distance L2 from an imaginary vertical plane P4, which is parallel to the transition 44 and intersects the center axis C3, the total distance between the transition 44 and the plane P4 amounting to L.

According to an embodiment of the invention, the distance L1 must not be greater than the distance L2. In other words, the ridge 42, such as this is represented by the center line C4, should be positioned nearer the transition 44 than the center C3 of the cutting insert. Another feature of the invention is that the ridge 42 is the only active engagement means of the cutting insert in the imaginary triangle T. In other words, no additional ridges, except for the ridge 42, are present between the transition 44 and the center of the cutting insert.

In the example shown, where the tool is rotatable and is a milling cutter, the active chip-removing main edge, which is designated 38*a* in FIG. 1, is indexed into a position somewhat outside the envelope surface 23 of the basic body, at the same time as the appurtenant wiper edge 40*a* is indexed into a position axially outside the end surface 17. Among the forces applied to the cutting insert during machining, the radially directed forces originating from the main edge 38*a* are dominant, but also axially directed forces are applied to the cutting insert from the wiper edge 40*a*, even if these are more moderate. The radial forces are carried mostly by the inner support surface 24 of the notch 19 (see FIG. 2) against which the inner flank 47 of a ridge 42 rests. The axial forces are carried primarily by the inner support surface 24 of the notch 21 against which the inner flank 47 of another ridge 42 is pressed. However, a certain part of the axial and radial forces is also carried by the support surfaces 26 of the notches 22, 20.

Figure 16:
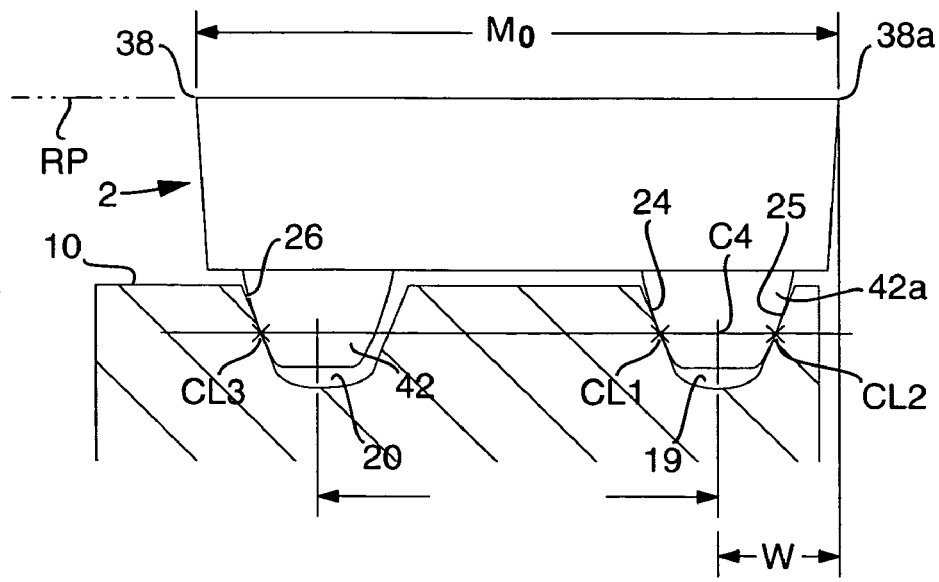
FIGS. 16-18 are schematic sections, which illustrate how the cutting insert can assume different positions in two notches included in the connecting surface of the basic body, FIG. 16 showing a perfectly manufactured cutting insert having nominal dimensions, FIG. 17 showing a cutting insert that has swollen in manufacture, FIG. 18 showing a cutting insert that has shrunk.
Figure 17:
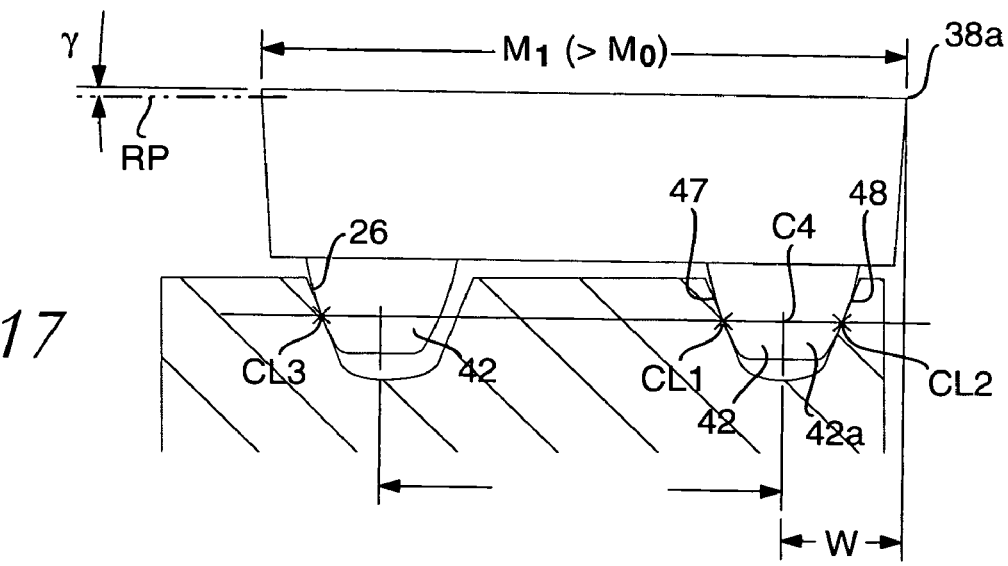
Figure 18:
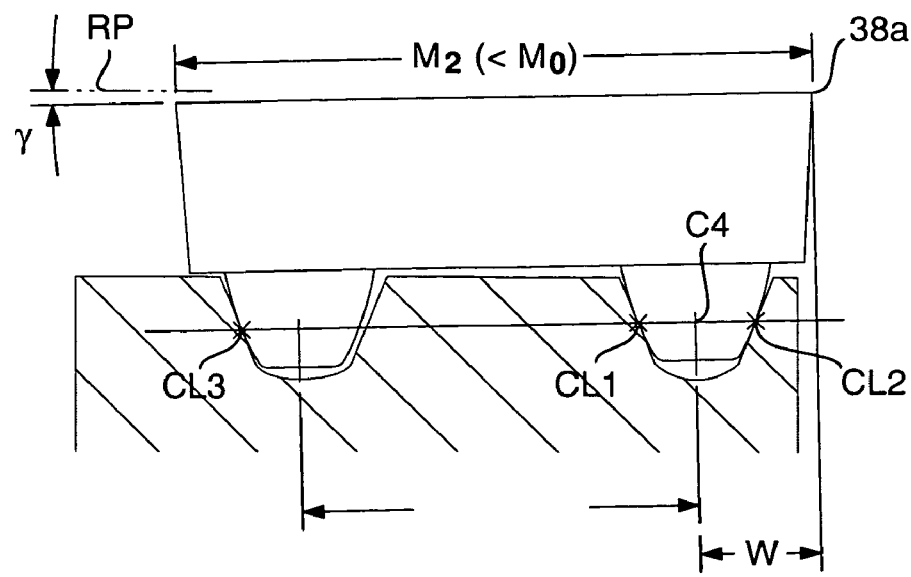

Reference is now made to FIGS. 16-18, which schematically illustrate how three cutting inserts, of different outcomes in the manufacture, perform in connection with the mounting of the cutting insert in the insert seat. In FIG. 16, a cutting insert is shown that is imagined to be perfect in so far that it is the result of a thoroughly successful outcome. This means that the cutting insert has obtained the exact, nominal dimensions, one of which is the length dimension $M_0$ between the active main edge 38*a* and the opposite, inactive edge 38. In this state, the cutting insert is "horizontally" oriented so far that the reference plane RP, which is defined by the topside of the cutting insert, is parallel to the bottom surface 10 of the insert seat. Furthermore, the two contact lines CL1 and CL2 of the outer ridge 42a against the support surfaces 24, 25 of the notch 19 are situated in a horizontal plane in which also the contact line CL3 of the inner ridge 42 against the single support surface 26 of the notch 20 is situated. It should be noted that the distance W between the active edge 38a and the center C4 of the ridge 42a is short in relation to the total length $M_0$ of the cutting insert.

In FIG. 17, a cutting insert is shown that is imagined to be the result of a poorer outcome in the manufacture. More precisely, the cutting insert is imagined to have swollen in relation to the nominal dimensions, whereby the length dimension $M_1$ has become greater than the nominal dimension $M_0$. Simply speaking, the cutting insert has become longer. If it is assumed that the nominal dimension $M_0$ amounts to 20 mm, and the swelling of the cutting insert according to FIG. 17 amounts to 0.5%, the dimension $M_1$ becomes 20.10 mm, i.e., the cutting insert has been extended by 0.10 mm. When the cutting insert (in a manual way and without screw) is brought down into the insert seat, the center C4 of the outer ridge 42a will assume substantially the same position as in FIG. 16, i.e., at the distance W from the active cutting edge 38a. However, the inner ridge 42 will alter the position so far that the contact line CL3 is located higher up along the appurtenant support surface 26 than in FIG. 16. In other words, here the cutting insert has assumed a position in which the topside of the cutting insert forms an angle γ with the reference plane RP. This orientation of the cutting insert in relation to the position according to FIG. 16 results in the contact line CL1 of the inner flank 47 being located higher up along the inner support surface 24 of the notch 19, while the contact line CL2 of the outer flank 48 being located further down along the outer support surface 25 of the notch 19 than in FIG. 16.

From the above, it is evident that the form defect in the form of an extension, which has resulted in the cutting insert, mostly is absorbed by and is compensated in the part of the cutting insert that extends inward from the outer ridge, such as this is represented by the center axis C4. Suppose the distance W amounts to 1/10 of the total length dimension M. Then, 90% of the resulted form defect will be absorbed by the inner parts of the cutting insert, while only 10% is distributed to the outer part of the cutting insert, which is present between the axis C4 and the active cutting edge 38a. Therefore, a form defect of 0.10 mm causes a practically almost negligible alteration of the position of the edge in relation to the basic body of 0.01 mm in relation to the desired position.

In FIG. 18 finally, there is shown an example of a cutting insert that has shrunk instead of swollen. In other words, $M_2$ is smaller than $M_0$. Also in this case, the cutting insert assumes a tilted position in relation to the position according to FIG. 16, although in the opposite direction in relation to the center axis C4 of the ridge 42a. In this case, the contact line CL3 of the inner ridge has gone down along the appurtenant support surface, at the same time as the contact line CL1 has drifted downward along the support surface thereof, while the contact line CL2 has drifted upward a distance along the support surface thereof.

With continued reference to FIGS. 16-18, the different figures are of a theoretical character so far that the contact between the surfaces is shown in the form of a line contact. However, in practice, the different surfaces included in the notches may be coined, i.e., deformed plastically, after one or more exchanges of cutting inserts. Hence, a certain coining of the comparatively soft material of the basic body arises regularly when the tightening screw is tightened by full force in order to rigidly fix the cutting insert, the pure line contact transforming into partial surface contact. Nevertheless, occurring form defects are absorbed in the way described above.

With renewed reference to FIGS. 12 and 15, the arching or chord height H of the flanks 47, 48 is so ample that the transition edge between a flank and the crest 49, which in this case is a sharp turning line 51, can not contact the support surface 24, 25 and damage the same. Furthermore, the depth of the ridge 42 is so great that the distance between the surface 10 and the step 52 (see FIG. 12) becomes sufficiently great in order to avoid collision between the underside of the cutting insert and the bottom surface 10 of the insert seat. In other words, the cutting insert is carried only via the various contact lines CL, irrespective of whether or not the same assuming a moderately tilted position as a consequence of possible form defects. In practice, the tilting angle γ amounts to at most approx. 0.3°, when the form defects are maximal (0.5%). Under these circumstances, the level difference between the surface 10 and the underside of the cutting insert, such as this is represented by the step 52, may amount to 0.1 mm.

What has been said above concerning the absorption of form defects in the radial dimension of the cutting insert, of course also applies to the absorption of form defects in the axial dimension. However, possible form defects, which manifest themselves in the fact that two adjacent ridges on the underside of the cutting insert do not form an angle of exactly 90° with each other, can be absorbed in the insert seat due to the resiliency of the border 33, which delimits the notch 21. Although the ridge 42a that is subjected to the dominant, radial cutting forces is anchored steadily in the appurtenant notch 19 (which is delimited by the relatively thick border 32), the ridge that is subjected to the considerably more moderate axial forces, and that is applied in the notch 21, may be anchored with lower requirements of stability. Therefore, as long as the inner flank of the ridge rests in an acceptable way against the inner support surface 24 of the notch 21, it is of less importance if the ridge deforms the outer, resilient border 33.

Advantages of the invention include the following. The interface according to the invention includes a fixed reference locus in the form of a ridge that is situated in the immediate vicinity of the active edge of the cutting insert. In such a way, it is guaranteed that possible form defects do not appreciably affect the space position of the edge in relation to the basic body, because the defects are distributed in the direction from outside inward instead of the opposite. The interface described above includes only two ridges (i.e., a pair in either coordinate direction), which are maximally spaced-apart by individually being situated nearer a transition to a clearance surface than the center of the cutting insert, and between which there are no other ridges. By the absence of intermediate ridges of the type included in traditional serration connecting surfaces, the risk that the cutting insert does not freely go down into the desired position in the connecting surface of the basic body is eliminated. Furthermore, it is guaranteed that the ridge serving as a fixed reference locus is not jammed in the appurtenant notch, inasmuch as the convex flanks of the ridge allow the contact lines against the support surfaces to "drift" freely along the same. In other words, the cutting insert can freely assume different tilting positions in spite of possible form defects.

Figure 19:
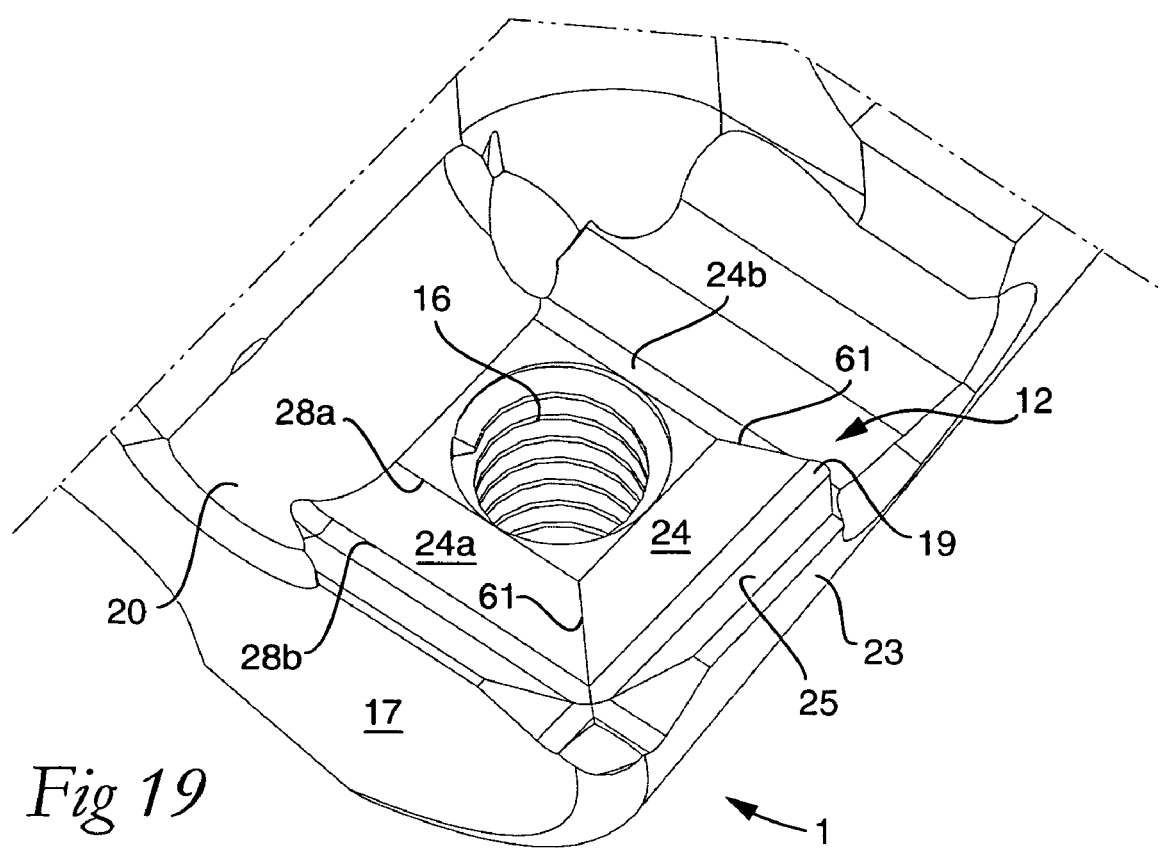
FIG. 19 is a perspective view of a connecting surface included in an alternative embodiment of the tool according to the invention.
Figure 20:
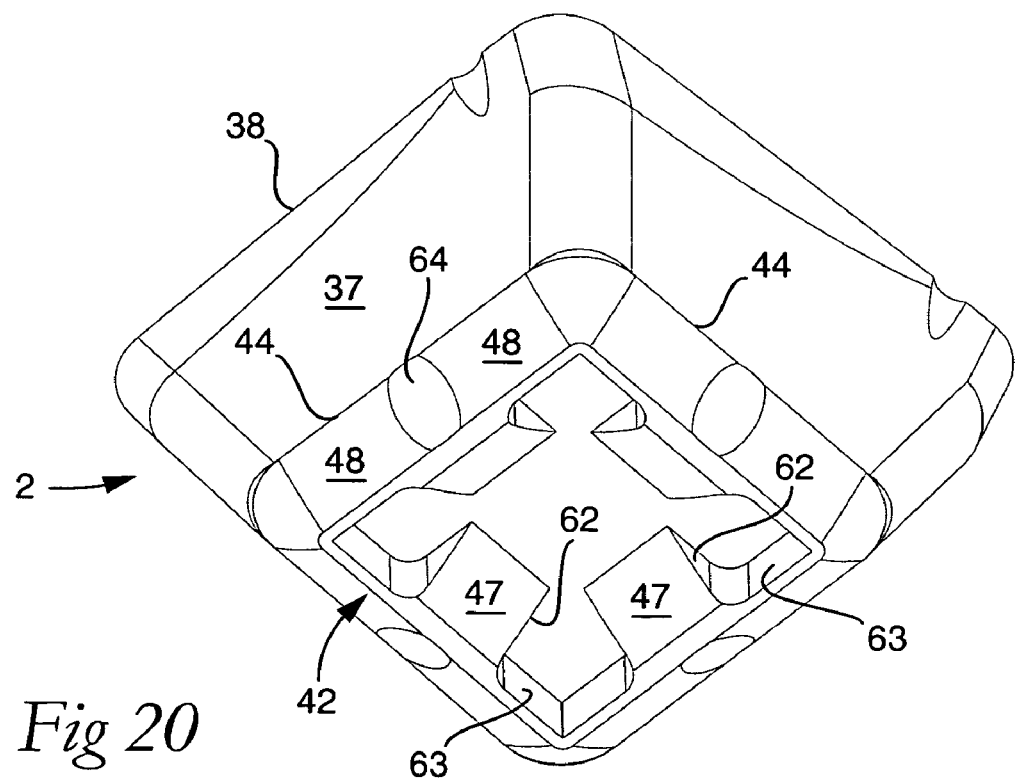
FIG. 20 is a perspective view from below of a cutting insert, which is applicable to the connecting surface according to FIG. 19.

Reference is now made to FIGS. 19 and 20, which illustrate a second, alternative embodiment of the tool according to the invention. FIG. 19 illustrates an insert seat or a primary connecting surface 12 of a basic body (also here a milling cutter), while FIG. 20 illustrates the secondary connecting surface 36 on the underside of a co-operating cutting insert 2.

In this embodiment, the connecting surface 12 of the basic body 1 includes only one notch 19 of the type that is delimited by two diverging support surfaces 24, 25. Two assisting support surfaces 24a, 24b are included, which extend in the direction inward from the inner support surface 24 of the notch 19. The individual assisting support surface has a length extension (defined by upper and lower border lines 28a, 28b) that forms an angle of 90° with the support surface 24. All support surfaces may advantageously be planar so far that not only the cross-section shape, but also the lengthwise shape, is defined by straight lines. However, in this connection at least the assisting support surfaces 24a, 24b may be made with a certain, moderate camber, i.e., a weak arching that is convex lengthwise, but not crosswise.

In the example, the individual assisting support surface 24a, 24b transforms directly into the support surface 24, which forms a main support surface, more precisely via a turning line 61. However, within the scope of the invention, it is feasible to make the frame-like material part that surrounds the hole 16 with round or chamfered corners, which cause the ends of the support surfaces to be spaced apart from each other.

As illustrated in FIG. 20, the cutting insert 2 includes, also in this case, four ridges 42, which are integrated in a frame having a square basic shape. However, here the inner flank or contact surface 47 of the individual ridge 42, having the purpose of transferring forces to the basic body, is considerably shorter than the outer flank 48. More precisely, the inner flank 47 is formed on a shoulder 62, which projects from the proper inside 63 of the ridge. In the example, the length of the shoulder (the extension along the ridge) amounts to about ⅓ of the total length of the ridge. The length of the shoulder may vary, but should amount to at least 25% and at most 50% of the entire length of the ridge. Also in this case, the flank 47 may be cambered longitudinally thereof.

In this embodiment, the clearance surface 37 of the cutting insert transforms directly into the individual ridge, i.e. via a transition 44 in the form of a turning line between the clearance surface 37 and the outer flank 48 of the ridge. Furthermore, the individual outer flank 48 includes two part surfaces, which are spaced-apart by a shallow countersink 64. In the example, said countersink 64 is centrally positioned along the ridge and thereby located opposite the inner shoulder 62.

When the cutting insert is mounted in the insert seat of the basic body, one of the four ridges will be applied in the notch 19, the flanks 47, 48 being abutted against the support surfaces 24, 25 in the way described above. Here, the flanks 47, 48, in accordance with the principle of the invention, are convex so that they can "roll off" against the support surfaces 24, 25. Furthermore, the inner flanks 47 of two adjacent shoulders 62 will be applied against the two assisting support surfaces 24a, 24b, more precisely along contact lines, the position of which along the assisting support surfaces is determined by the condition of the cutting insert, i.e., the outcome in the manufacture. If the cutting insert is perfect and has nominal dimensions, the contact line will become parallel to the upper and lower border lines 28a, 28b of the individual assisting support surface. However, if the cutting insert has swollen, the contact line will be located further down along the assisting support surface. Conversely, the contact line of a cutting insert that has shrinked is located higher up along the assisting support surface. In both cases, the contact line is inclined in relation to the longitudinal axis of the assisting support surface.

Figure 21:
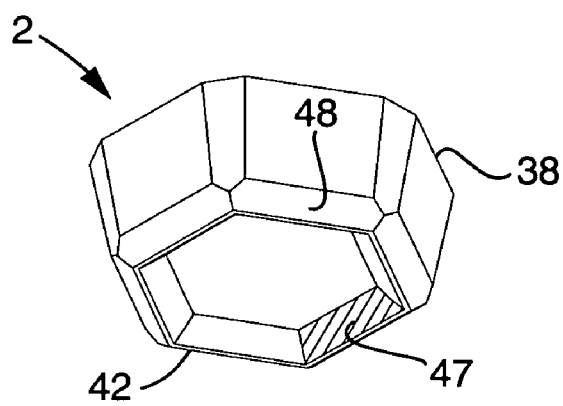
FIG. 21 is a perspective view of a third, alternative cutting insert according to the invention.

In FIG. 21, an additional example of a cutting insert is shown having a polygonal, multi-angular basic shape. More precisely, the cutting insert has a hexagonal shape and includes six major cutting edges 38 as well as equally many ridges 42, which pair-wise meet each other at an obtuse angle in the individual corners. According to the invention, at least the inner flanks 47 are made with a convex shape. Also the outer flanks 48 may advantageously be convex.

Figure 22:
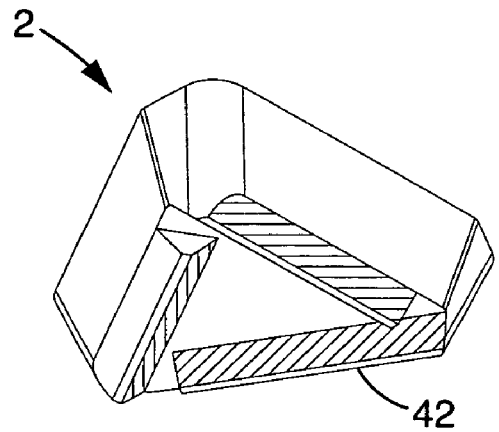
FIG. 22 is a perspective view of a fourth, alternative embodiment of the cutting insert.

In FIG. 22, a cutting insert is shown having a triangular shape. This embodiment differs from the embodiments described above in that the ridges 42—among other things for space reasons—are not integrated with each other, but formed as spaced-apart elements on the underside of the cutting insert.

Figure 23:
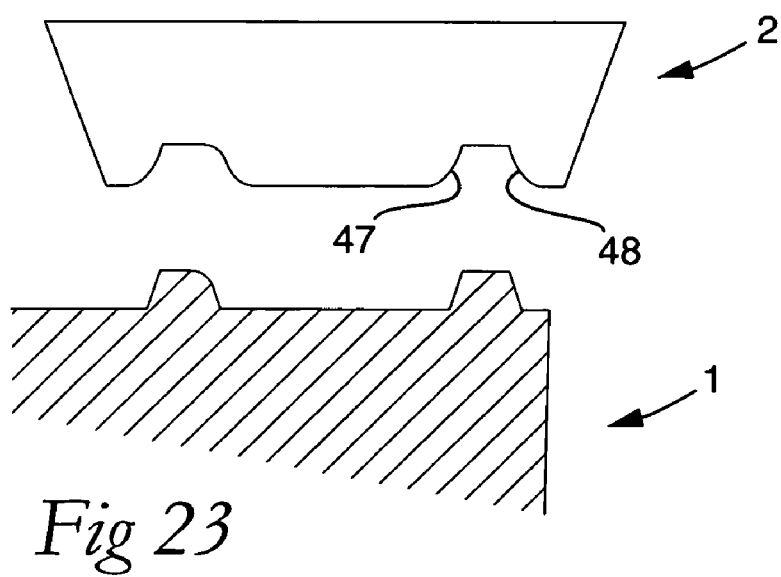
FIG. 23 is a schematic exploded view showing an alternative embodiment of the engagement means in the connecting surfaces of the basic body and the cutting insert, respectively.

Now, reference is made to FIG. 23, which illustrates how the primary engagement means of the basic body also may be male-like elements, e.g., in the form of ridges, while the secondary engagement means of the cutting insert 2 are notches. In this case, the convex flanks 47, 48 are formed in the female-like notches, while the support surfaces of the ridges may be planar (also other shapes are feasible).

Figure 24:
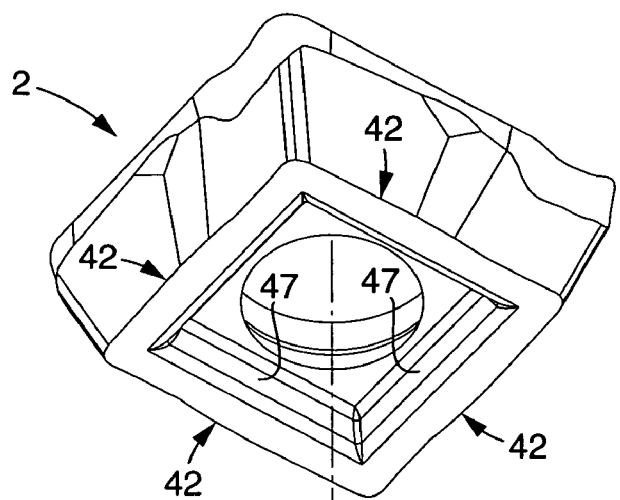
FIG. 24 is a snake's eye view of an alternative embodiment of a cutting insert according to the invention.
Figure 25:
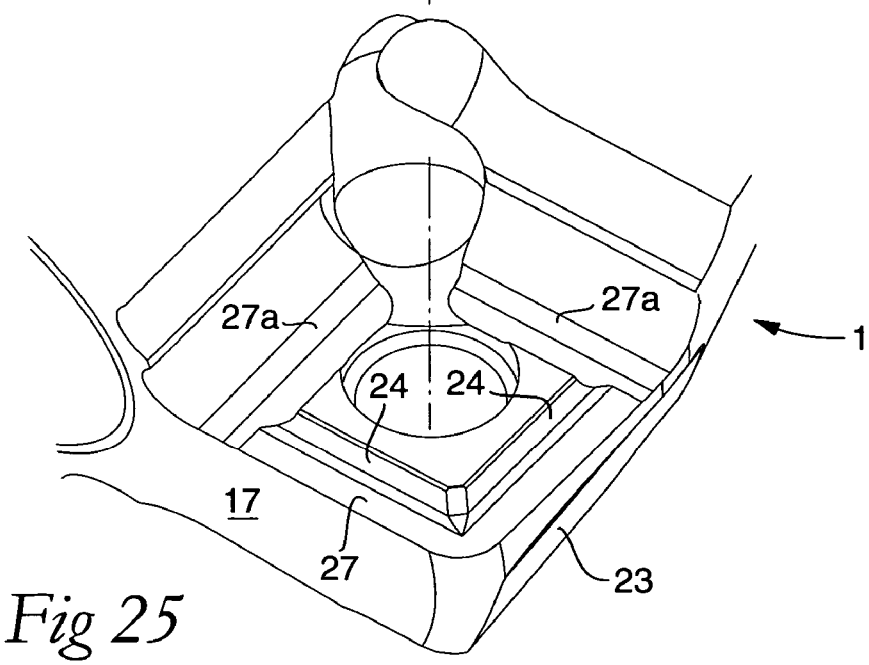
FIG. 25 is a bird's eye view of an insert seat for receiving the cutting insert of FIG. 24.
Figure 26:
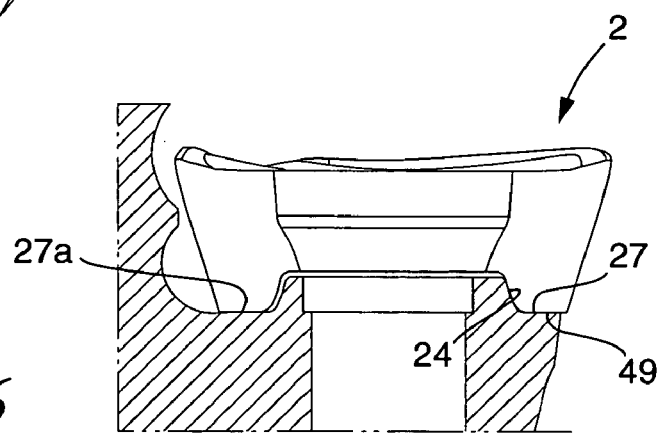
FIG. 26 is a section showing the cutting insert of FIG. 24 mounted in the seat of FIG. 25.

Another alternative embodiment of the tool is shown in FIGS. 24 to 26. In this case the cutting insert 2 includes four ridges 42 which form a closed frame and include flat crest surfaces 49 located in a common plane. Inside each ridge there is a convex inner flank 47 located at a certain level above each bottom surface. The co-operating insert seat 12 shown in FIG. 25 is formed with only two active support surfaces 24 which raise above two flat bottom surfaces 27 bordering the surfaces 17, 23 of the basic body 1. Analogous bottom surfaces 27a form together with surfaces 27 a square support against which the crest surfaces 49 of the ridges 42 may rest. When the cutting insert is fixed by means of a flexible screw, those two inner flanks (invisible) which are opposed to the two flanks 47 which are visible in FIG. 24, will be held pressed against the support surfaces 24 formed on the central land surrounding the hole 16. In other words, the two outmost ridges 42 situated along surfaces 17, 23 are supported axially and radially by the support surfaces 24, and also vertically towards the bottom surfaces 27. The other two ridges, which are idle, are solely supported by the bottom surfaces 27a, i.e. they have no flank contact with any part of the seat.

The invention is not only limited to the embodiments described above and shown in the drawings. Thus, the invention is at least theoretically applicable to tools, the cutting inserts of which have only one chip-removing main edge and only one engagement means, e.g., a ridge. Furthermore, the female-like engagement means may be made in another way than in the form of a notch. Hence, the same may be a countersink delimited by a single support surface (cf. the blind notches). Furthermore, the individual ridge does not need to be formed as a single continuous elongate material portion, since it is feasible to arrange two or a plurality of short projections in a row one after the other while forming an elongate configuration, the flanks of the individual ridges abutting against a common support surface. As has already been indicated in the preceding description, it is also feasible to make the individual flank of a ridge in the form of two or a plurality of part surfaces having a convex shape and being spaced-apart axially along the ridge. In this connection, the individual support surface does not necessarily need to be planar. Thus, the support surface may be slightly arched, e.g., concavely arched, although with a flatter curvature than the co-operating, convex flank. Accordingly, a contact line or a contact place between the flank and the support surface can move freely along the surfaces without damaging the same. Furthermore, it should be noted that the centers of the cutting insert and insert seat, respectively, do not necessarily need to be center axes of holes. Thus, the center of the cutting insert may be defined by the geometrical locus at which the force from a clamp is applied to the cutting insert.

The concept basic body should be interpreted in a wide sense, so far that the connecting surface that forms an insert seat may be formed in a separate attachment (e.g. a shim plate), which in turn is fixed in a suitable way to a body that serves as a holder or carrier of the cutting inserts.

Even if the two flanks of the individual ridge in the example have an angle of convergence that is equal to the angle of divergence between the two support surfaces of the co-operating notch, these angles may also differ, more precisely in such a way that the angle of convergence of the ridge flanks is somewhat greater than the angle of divergence of the support surfaces.

In conclusion, the convex or bulging shape of the force-transferring flank does not necessarily have to be realized in the form of a single, truly arched or rounded surface that extends along the entire extension of the engagement means between upper and lower border lines. Hence, the convexity may also be provided by means of a number of (planar or arched) facet surfaces, which may transform into each other via smoothly rounded radius transitions, which are cautious to the support surface with which the flank co-operates. The flank should not have any sharp edges, which could dig into the support surface and damage the same.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising: a basic body having an insert seat defined by a center and in the form of a connecting surface, in which there is included an elongate and female or male primary engagement means spaced apart from the center, and a replaceable cutting insert having at least one chip-removing main edge, which is spaced apart from a center of the cutting insert, and from which a clearance surface extends toward a transition to an underside in the form of a connecting surface, in which an elongate and male or female secondary engagement means is included, which is positioned nearer the transition than the center of the cutting insert, and includes a flank that is pressable against a support surface included in the primary engagement means of the connecting surface of the basic body, wherein the secondary engagement means is the only active engagement means of the cutting insert in an imaginary triangle between the center of the cutting insert and opposite ends of the transition, and wherein the flank has a cross section-wise convex shape.

2. The tool according to claim 1, wherein the connecting surface of the cutting insert includes two spaced-apart, secondary engagement means, which individually are situated nearer an adjacent transition to a clearance surface than the center of the cutting insert, and the connecting surface of the basic body correspondingly includes two primary engagement means, spaced-apart from the center of the insert seat, for co-operation with the two secondary engagement means of the cutting insert.

3. The tool according to claim 2, wherein the two secondary engagement means of the cutting insert are identical and allow indexing of the cutting insert in at least two positions.

4. The tool according to claim 3, wherein the cutting insert includes a polygonal basic shape and at least two main edges as well as appurtenant clearance surfaces, wherein the connecting surface of the basic body and the connecting surface of the cutting insert are formed with an equal number of engagement means as the number of main edges of the cutting insert.

5. The tool according to claim 1 wherein the primary engagement means, which is included in the connecting surface of the basic body, is female by being a countersink formed in the basic body and delimited by at least one support surface, and wherein each co-operating, secondary engagement means of the connecting surface of the cutting insert is a male ridge, which has inner and outer flanks, at least the inner flank having the convex cross-section shape.

6. The tool according to claim 5, wherein the countersink in the basic body is a notch.

7. The tool according to claim 6, wherein the notch is delimited by two spaced-apart, inner and outer support surfaces, which diverge in the direction from a bottom toward an opening.

8. The tool according to claim 7, wherein the outer support surface is included in a border, which is, at least partially, resilient by having a thickness that is smaller than the height thereof.

9. The tool according to claim 5, wherein the individual support surface is planar.

10. The tool according to claim 7, wherein the angle of divergence between the two support surfaces is at least 90°.

11. The tool according to claim 6, wherein all notches, besides at most two main notches having a pair of diverging support surfaces, are wider than the main notches to form blind notches, for housing ridges that are substantially inactive in respect of force transfer between the cutting insert and the basic body.

12. The tool according to claim 11, wherein at most two of the blind notches include a support surface against which a convex flank of a ridge is pressable.

13. The tool according to claim 5, wherein the connecting surface of the basic body includes a notch that is delimited by two diverging support surfaces, an inner one of which forms a main support surface, and two assisting support surfaces, which individually extend at an angle of 90° to the main support surface.

14. The tool according to claim 13, wherein the individual assisting support surface transforms directly into the main support surface via a turning line.

15. The tool according to claim 13, wherein the individual ridge of the cutting insert is formed with an inner flank, which is shorter than the outer flank.

16. The tool according to claim 15, wherein the inner flank is included in a shoulder, which projects from an inside of the ridge.

17. The tool according to claim 1, wherein the cutting insert is formed solely by pressing and does not include ground surfaces.

18. The tool according to claim 5, wherein inner convex flanks of two angled first ridges are urged against two support surfaces of the insert seat, while two other ridges have no flank contact with the insert seat, and wherein lower crest surfaces of at least the first ridges rest on bottom surfaces included in the insert seat.

19. A cutting insert for chip removing machining, comprising: a chip-removing main edge, which is separated from a center of the cutting insert and from which a clearance surface extends toward a transition to an underside in the form of a connecting surface, in which an elongate, male or female engagement means is included, which is positioned nearer the transition than the center of the cutting insert, and includes a flank for transferring cutting forces in a direction transverse to the length extension of the engagement means, wherein the engagement means is the only active engagement means in an imaginary triangle between the center of the cutting insert and opposite ends of the transition, and wherein the flank has a cross section-wise convex shape.

20. The cutting insert according to claim 19, wherein the connecting surface includes two spaced-apart engagement means, which individually are situated nearer an adjacent transition to a clearance surface than the center of the cutting insert.

21. The cutting insert according to claim 20, wherein the engagement means are identical and allow indexing of the cutting insert.

22. The cutting insert according to claim 21, wherein the cutting insert includes a polygonal basic shape and at least two main edges as well as appurtenant clearance surfaces, wherein the connecting surface is formed with an equal number of engagement means as the number of edges.

23. The cutting insert according to claim 22, wherein the engagement means converge in corners, each one of which is defined by a bisector between two adjacent main edges.

24. The cutting insert according to claim 19, wherein the individual engagement means is a male ridge having two opposite, inner and outer flanks, which converge toward a crest, and at least the inner flank includes the convex cross-section shape.

25. The cutting insert according to claim 24, wherein the two flanks of the ridge are cross section-wise conformal and symmetrical in relation to an axis, which is centrally positioned inside the ridge and extends longitudinally thereof.

26. The cutting insert according to claim 19, wherein the individual flank is in the form of a convexly arched surface, which extends continuously unbroken, between upper and lower border lines, the upper one of which forms a turning line to a planar part of the underside of the cutting insert.

27. The cutting insert according to claim 26, wherein the lower border line forms a turning line to the crest of the ridge.

28. The cutting insert according to claim 26, wherein a chord height of the flank, defined as the perpendicular distance between an imaginary plane between the upper and lower border lines, and the point of the flank situated farthest out in relation to the plane, is at most $\frac{1}{10}$ of the extension of the flank surface between the border lines.

29. The cutting insert according to claim 24, wherein the angle of convergence between the two flanks of the ridge is at least 90°.

30. The cutting insert according to claim 19, wherein the convex cross-section shape of the flank is defined by an involute curve.

31. The cutting insert according to claim 24, wherein the ridges are integrated with each other while forming a continuous frame on the underside of the cutting insert.

32. The cutting insert according to claim 31, wherein the individual end of the individual flank ends at a distance from the individual end of the ridge.

33. The cutting insert according to claim 31, wherein two adjacent ridges of the frame meet each other at an angle that is at least 90°.

34. The cutting insert according to claim 19, wherein the inner flank is shorter than the outer flank.

35. The cutting insert according to claim 34, wherein the inner flank is formed on a shoulder, which projects from an inside of the ridge.

36. The cutting insert according to claim 35, wherein the length of the shoulder is at most half of the total length of the ridge.

37. The cutting insert according to claim 19, wherein the clearance surface transforms directly into a ridge via a transition in the form of a turning line between the clearance surface and the outer flank of the ridge.

38. The cutting insert according to claim 19, wherein the individual flank includes two part surfaces, which are spaced-apart by a countersink in the ridge.

39. The cutting insert according to claim 19, wherein the cutting insert is formed solely by pressing and does not include ground surfaces.

40. A cutting insert for chip removing machining, comprising:
   a chip-removing main edge separated from a center of the cutting insert;
   a clearance surface extending from the main edge toward a transition;
   an underside extending from the transition, the underside being a connecting surface; and
   one of an elongate male and elongate female engagement member formed on the underside, positioned nearer the transition than the center of the cutting insert, and including a flank that transfers cutting forces in a direction transverse to a length extension of the engagement member, wherein the engagement member is the only active engagement in an imaginary triangle between the center of the cutting insert and opposite ends of the transition, and wherein the flank has a cross section-wise convex shape.

* * * * *